United States Patent Office 2,810,761

Patented Oct. 22, 1957

2,810,761

PRODUCTION OF POLYENIC ALDEHYDES AND ALCOHOL

Edward N. Wheeler, Corpus Christi, Tex., assignor to Celanese Corporation of America, New York, N. Y., a corporation of Delaware No Drawing. Application February 25, 1955, Serial No. 490,681

13 Claims. (Cl. 260—601)

This invention relates to the production of polyenic aldehydes and relates more particularly to the production of polyenic aldehydes from 1,1,3,5-tetraalkoxyhexanes.

It is an object of this invention to provide a novel and economical process for the production of polyenic aldehydes from 1,1,3,5-tetraalkoxyhexanes.

Another object of this invention is the provision of a new and efficient process for the production of 2,4-hexadienal by the vapor phase catalytic reaction of water and a 1,1,3,5-tetraalkoxyhexane.

Other objects of this invention will be apparent from the following detailed description and claims.

In accordance with one aspect of this invention, a polyenic aldehyde such as 2,4-hexadienal is produced by passing a mixture of a 1,1,3,5-tetraalkoxyhexane and water in the vapor phase over a catalyst comprising alumina which has been activated by treatment with a lower aliphatic acid.

In the 1,1,3,5-tetraalkoxyhexane employed in the practice of this invention, all four of the alkoxy groups are preferably lower alkoxy, e. g. methoxy, ethoxy, propoxy or butoxy, although higher alkoxy groups, e. g. lauroxy, may be present if desired. All four of the alkoxy groups may be the same, or a mixed 1,1,3,5-tetraalkoxyhexane may be used, e. g. 1,1-dimethoxy-3,5-diethoxyhexane. The 1,1,3,5-tetraalkoxyhexane may also carry substituents, such as alkyl or alkoxyalkyl radicals, as in 1,1,3,5-tetramethoxy-6-methylhexane, otherwise known at 1,1,3,5-tetramethoxyheptane; or 1,1,3,5-tetramethoxy-6-ethylhexane, otherwise known as 1,1,3,5-tetramethoxyoctane; 1,1,3,5-tetramethoxy-6-alpha-methoxyethylhexane, otherwise known as 1,1,3,5,7-pentamethoxyoctane. In the latter case the product of the reaction of this invention is 2,4,6-octatrienal.

The proportions of the 1,1,3,5-tetraalkoxyhexane and water may be varied widely. However, it is preferred to have present an excess of water over the amount necessary to react with all of the 1,1,3,5-tetraalkoxyhexane, i. e. more than 1 mole of water per mole of 1,1,3,5-tetraalkoxyhexane. For example, 0.8 to 5 parts by weight of water may be used for each part by weight of 1,1,3,5-tetraalkoxyhexane. It is desirable to supply the water in the form of superheated steam and to use this steam for vaporizing the 1,1,3,5-tetraalkoxyhexane, which is generally liquid at room temperature.

Suitable alumina materials for use in the practice of this invention are activated alumina (i. e. hydrate alumina treated by heating it in well known manner to an elevated temperature to effect a partial dehydration and a corresponding increase in surface area), or activated alumina on which a small amount of a promoter such as palladium or platinum has been deposited. As previously stated, the alumina material should be treated with a lower aliphatic acid. Optimum results have been obtained by the use of acetic acid. Other acids which may be used for treating the alumina material are formic, propionic, butyric, valeric and caproic acids. The treatment of the alumina can be carried out by passing a stream of lower aliphatic acid vapors thereover, by soaking the alumina in the lower aliphatic acid in liquid glacial or aqueous form, or by incorporating the lower aliphatic acid into the stream of reactants passing over the alumina. One very suitable method is to add acetic acid to the stream of reactants, the concentration of acetic acid in said stream being, for example, 3 to 25% by weight, at the beginning of the process and then to discontinue the addition of acetic acid once the treated alumina has attained the desired degree of catalytic activity. It may be necessary after the catalyst has been used for some time to retreat it with the acid in the same manner.

The catalyst may be used in the form of a fixed bed of granules, e. g. of 1 to 40 mesh particle size (U. S. Standard). Alternatively very fine particles of the catalyst of, for example, 80 to 250 mesh particle size may be employed in fluidized form in the reaction.

The process of this invention is carried out at an elevated temperature, preferably in the range of about 160 to 300° C., best results being obtained in the range of about 190 to 260° C. It has been found that the presence of a metal of group VIII of the periodic table, such as palladium or platinum, on the alumina catalyst has the effect of making it possible to get a maximum yield of the polyenic aldehyde at a temperature lower than that which would be necessary for the same yield if no such metal were present.

The time of contact between the reactants and the catalyst may be varied, as desired. For example, suitable contact times, expressed in terms of the "liquid space velocity" of the 1,1,3,5-tetraalkoxyhexane are 0.1 $hr.^{-1}$ to 0.7 $hr.^{-1}$. The "liquid space velocity" of the 1,1,3,5-tetraalkoxyhexane is defined as the volume of liquid 1,1,3,5-tetraalkoxyhexane fed to the reactor per hour divided by the bulk volume of the catalyst in the reactor.

In one convenient embodiment of this invention a stream of the liquid 1,1,3,5-tetraalkoxyhexane and a stream of superheated steam are fed continuously into a flasher. The resulting vapors then flow upward, first through a preheater and then through a vertical reactor containing the bed of catalyst. The vapor from the reactor is then liquefied by passing it downward through a condenser. The desired polyenic aldehyde may be recovered from the liquefied reaction products by distillation. However, if desired, the liquefied reaction products containing the polyenic aldehyde may be further treated, as, by hydrogenation, to produce alcohols.

By the use of the process of this invention there are obtained very good yields of the polyenic aldehyde at high efficiencies of conversion. When other catalysts, such as silica gel, are substituted for the catalysts employed in the present invention the yields and efficiencies are much lower.

The following examples are given to illustrate the invention further. All proportions are by weight unless otherwise indicated.

*Example I*

A stream comprising 45% by weight of vapors of 1,1,3,5-tetramethoxyhexane, 50% by weight of steam and 5% by weight of acetic acid is passed continuously over a bed of granules of activated alumina of 4 to 6 mesh particle size, said alumina carrying on its surface 0.5% of its weight of palladium. The temperature of the catalyst bed of alumina is 199 to 205° C. and the liquid space velocity of the 1,1,3,5-tetramethoxyhexane is 0.56 $hour^{-1}$. The reaction products are liquefied by passing them continuously through a condenser cooled with circulating ice water. By fractional distillation, 2-4-hexadienal is recovered from the liquefied reaction products, the yield of 2,4-hexadienal (B. P. 69° C. at 20 mm., and $n_D^{20}$ 1.5425) being 83% and the efficiency of conversion of the 1,1,3,5-tetramethoxyhexane to 2,4-hexadienal being 88%.

*Example II*

The process of Example I is repeated with the following exceptions: The catalyst, which in this case carries no palladium, is pretreated by passing thereover water vapor which contains 10% of acetic acid at 180° C. for 1 hour. The reaction mixture fed to the bed of catalyst contains 48% by weight of 1,1,3,5-tetramethoxyhexane, 52% of steam and no acetic acid, while the liquid space velocity of the 1,1,3,5-tetramethoxyhexane is 0.40 per hour$^{-1}$ rather than 0.56 per hour$^{-1}$, and the temperature of the catalyst bed is 240–247° C. The yield of 2,4-hexadienal is 53% and the efficiency is 86%.

*Example III*

The process of Example I is repeated, using a stream comprising 42% of vapors of 1,1,3,5-tetramethoxyoctane, 55% of steam and 3% of acetic acid, a temperature of the catalyst bed of 216 to 221° C., and a space velocity of 0.42 hour$^{-1}$. The liquefied reaction products, containing 2,4-octadienal, are hydrogenated with hydrogen under pressure at a temperature of 148° C. in the presence of 10% of Raney nickel catalyst. The resulting product is then fractionally distilled to recover 1-octanol. The yield of 1-octanol is 62%.

*Example IV*

Example II is repeated, using 1,1,3,5,7-pentamethoxyoctane in place of the 1,1,3,5-tetramethoxyhexane. Fractionation of the product yields 2,4,6-octatrienal.

It is to be understood that the foregoing detailed description is merely given by way of illustration and that many variations may be made therein without departing from the spirit of my invention.

Having described my invention, what I desire to secure by Letters Patent is:

1. In the process for the production of a polyenic aldehyde by the reaction of water and a 1,1,3,5-tetraalkoxyhexane, the improvement which comprises carrying out said reaction in the vapor phase at an elevated temperature in the presence of a catalyst comprising alumina which has been treated with a lower aliphatic acid.

2. In the process for the production of 2,4-hexadienal by the reaction of water and 1,1,3,5-tetraalkoxyhexane, the improvement which comprises carrying out said reaction in the vapor phase at an elevated temperature in the presence of a catalyst comprising alumina which has been treated with a lower aliphatic acid.

3. In the process for the production of 2,4-hexadienal by the reaction of water and 1,1,3,5-tetraalkoxyhexane, the improvement which comprises carrying out said reaction in the vapor phase at a temperature of 160° to 300° C. in the presence of a catalyst comprising alumina which has been treated with acetic acid.

4. In the process for the production of 2,4-hexadienal by the reaction of water and 1,1,3,5-tetramethoxyhexane, the improvement which comprises carrying out said reaction in the vapor phase at an elevated temperature in the presence of a catalyst comprising alumina which has been treated with a lower aliphatic acid.

5. In the process for the production of 2,4-hexadienal by the reaction of water and 1,1,3,5-tetramethoxyhexane, the improvement which comprises carrying out said reaction in the vapor phase at an elevated temperature in the presence of a catalyst comprising alumina which has been treated with acetic acid.

6. In the process for the production of 2,4-hexadienal by the reaction of water and 1,1,3,5-tetramethoxyhexane, the improvement which comprises carrying out said reaction in the vapor phase at a temperature of 160° to 300° C. in the presence of a catalyst comprising activated alumina which has been treated with acetic acid.

7. In the process for the production of 2,4-octadienal by the reaction of water and 1,1,3,5-tetramethoxyoctane, the improvement which comprises carrying out said reaction in the vapor phase at an elevated temperature in the presence of a catalyst comprising alumina which has been treated with a lower aliphatic acid.

8. Process for the production of 1-octanol which comprises reacting in the vapor phase, water and 1,1,3,5-tetramethoxyoctane in the presence of a catalyst comprising activated alumina which has been treated with acetic acid and hydrogenating the reaction product containing 2,4-octadienal to produce 1-octanol.

9. Process for the production of 2,4,6-octatrienal comprising reacting water and 1,1,3,5,7-pentamethoxyoctane in the vapor phase at an elevated temperature in the presence of a catalyst comprising alumina which has been treated with a lower aliphatic acid.

10. Process as set forth in claim 9 wherein the acid is acetic.

11. Process as set forth in claim 10 in which said catalyst contains a metal of group VIII of the periodic table.

12. Process as set forth in claim 10 in which said catalyst contains palladium.

13. Process as set forth in claim 1 in which said catalyst contains a metal of group VIII of the periodic table.

References Cited in the file of this patent

UNITED STATES PATENTS

| | | |
|---|---|---|
| 2,517,916 | Pavlic | Aug. 8, 1950 |
| 2,676,991 | Guntrum et al. | Apr. 27, 1954 |

OTHER REFERENCES

Hoaglin et al.: Journal of the American Chemical Soc., 71, 3468–72 (1949).